United States Patent [19]
Schwartz

[11] 3,868,828
[45] Mar. 4, 1975

[54] METHOD AND MEANS FOR PRESERVING COMESTIBLES

[75] Inventor: Ralph E. Schwartz, Elgin, Ariz.

[73] Assignee: Ovitron Research Corporation, Elgin, Ariz.

[22] Filed: Mar. 2, 1973

[21] Appl. No.: 337,664

Related U.S. Application Data

[62] Division of Ser. No. 87,060, Nov. 5, 1970, Pat. No. 3,729,948.

[52] U.S. Cl............ 62/196, 62/306, 62/333, 62/376
[51] Int. Cl............ F25b 41/06
[58] Field of Search....... 62/333, 64, 306, 373, 376, 62/196, 200

[56] References Cited
UNITED STATES PATENTS

| | | | |
|---|---|---|---|
| 2,479,848 | 8/1949 | Mackey et al. | 62/333 |
| 2,502,527 | 4/1950 | McFarlan | 62/374 X |
| 2,509,299 | 5/1950 | Grom | 62/306 X |
| 3,007,319 | 11/1961 | Ogden | 62/64 |
| 3,241,328 | 3/1966 | Engel et al. | 62/55 X |
| 3,607,646 | 9/1971 | deRoissart | 62/306 X |
| 3,632,473 | 1/1972 | Belzer et al. | 62/306 X |

*Primary Examiner*—Meyer Perlin
*Assistant Examiner*—Ronald C. Capossela
*Attorney, Agent, or Firm*—Hopgood, Calimafde, Kalil, Blaustein & Lieberman

[57] ABSTRACT

Solid living comestibles such as fish are stored under pressure at below-0°C temperatures, in a substantially non-dilatable vessel. The environment for such storage is a coolant liquid such as seawater which is, of course, subjected continuously to the storage pressure but which is circulated through the vessel from a point outside the vessel. Thus, external to the vessel, means are provided for controlling the coolant temperature and pressure, and thereby also the environmental temperature and pressure of the stored comestibles within the vessel.

10 Claims, 3 Drawing Figures

METHOD AND MEANS FOR PRESERVING COMESTIBLES

This is a division of application Ser. No. 87,060 filed Nov. 5, 1970 now U.S. Pat. No. 3,729,948.

This invention relates to the preservation of perishable comestibles and in particular solid comestibles such as fish. Although applicable to other kinds of delicate comestibles, such as tomatoes, the invention will be particularly described in the context of preserving fish.

Chemical reactions and physical processes occur continuously in living organisms and involve a complex network of reactions. The rates of metabolic reactions are determined by temperature, pressure, and the concentrations of reactants and catalysts. Almost all metabolic reactions are catalyzed by enzymes.

Enzymes control metabolism through what are known as metabolic pathways. There is a constant use of energy to support enzymatic reactions in a given series of steps, and the rate of these reactions is governed by the environment of the organism.

The normal environment of comestible organisms is that in which the cellular fluids are in a liquid state under ambient pressure conditions. The cellular fluids of all comestible organisms are aqueous solutions. When the temperature is lowered to the point where cellular fluids will go from the liquid to the solid state, the balance between the constituents of the cells is disrupted, and there is a loss of intracellular water due to variations in vapor pressure. The resultant concentration of the solutes within the cell will cause loss of viability. The uncontrolled growth of ice crystals may also occur, causing rupture of the cells. Thus, the primary limit of slowing down the metabolic rate of comestible organisms is attributable to change of state.

A great deal of work has been done in cryobiology. Various methods have been proposed for rapidly going through and beyond the point of change of state. But to date, none of these has been eminently successful. Survival rates are much less than would be necessary to retain a viable organism. Another critical parameter is the rate of cooling. While rapid cooling under certain conditions might be indicative, slower cooling rates are required through given rates of temperature change because the balance of solutes in bound water within the cells has to be maintained.

To be more specific, frozen fish are usually well protected against chemical or bacteriological deterioration. However, due to intracellular crystalline ice formation most species undergo changes in "consistency" which detract from their quality as food. For this reason, an economically feasible process for maintaining fish during transport in bulk, by sea or land, at a temperature known to prevent chemical changes, while also preventing changes in physical structure, would significantly increase the market value of the catch.

It is, accordingly, an object of the invention to provide an improved method and means for storing comestibles of the character indicated.

Another object is to provide a method and means for storing a living comestible organism by subjecting the same to a controlled environment in which the metabolic rate of the organism is substantially reduced.

A further object is to achieve the foregoing objects without loss of viability and, specifically, without excessive solute or crystal formation within cells of the organism.

It is also an object to achieve the stated objects without use of chemical or other additives to the comestible.

It is a specific object of the invention to provide a method and means for using controlled elevated pressure and reduced temperature to achieve the foregoing objects.

Another specific object is to provide a method and means whereby seafood such as fish can be held in "ocean fresh" condition, and whereby vegetables such as ripe tomatoes can be held in "vine ripe" condition, for prolonged periods.

It is a general object to achieve the foregoing with relatively simple apparatus, which is readily transportable and self-contained, which can be managed safely by relatively unskilled and unsophisticated personnel, and which relies upon locally plentiful liquids, such as water.

Other objects and various further features of novelty and invention will be pointed out or will occur to those skilled in the art from a reading of the following specification, in conjunction with the accompanying drawings. In said drawings.

Briefly stated, the invention contemplates storage and, if desired, transportation of living comestibles such as fish, within a substantially non-dilatable vessel, under controlled conditions of elevated pressure at below-0°C temperature. The environment for such storage is a coolant liquid such as seawater which is of course subjected continuously to the storage pressure but which is circulated through the vessel from a point outside the vessel. Thus, external to the vessel, means are provided for controlling the coolant temperature and pressure, and thereby also the environmental temperature and pressure of the stored comestibles within the vessel.

Figure 1:
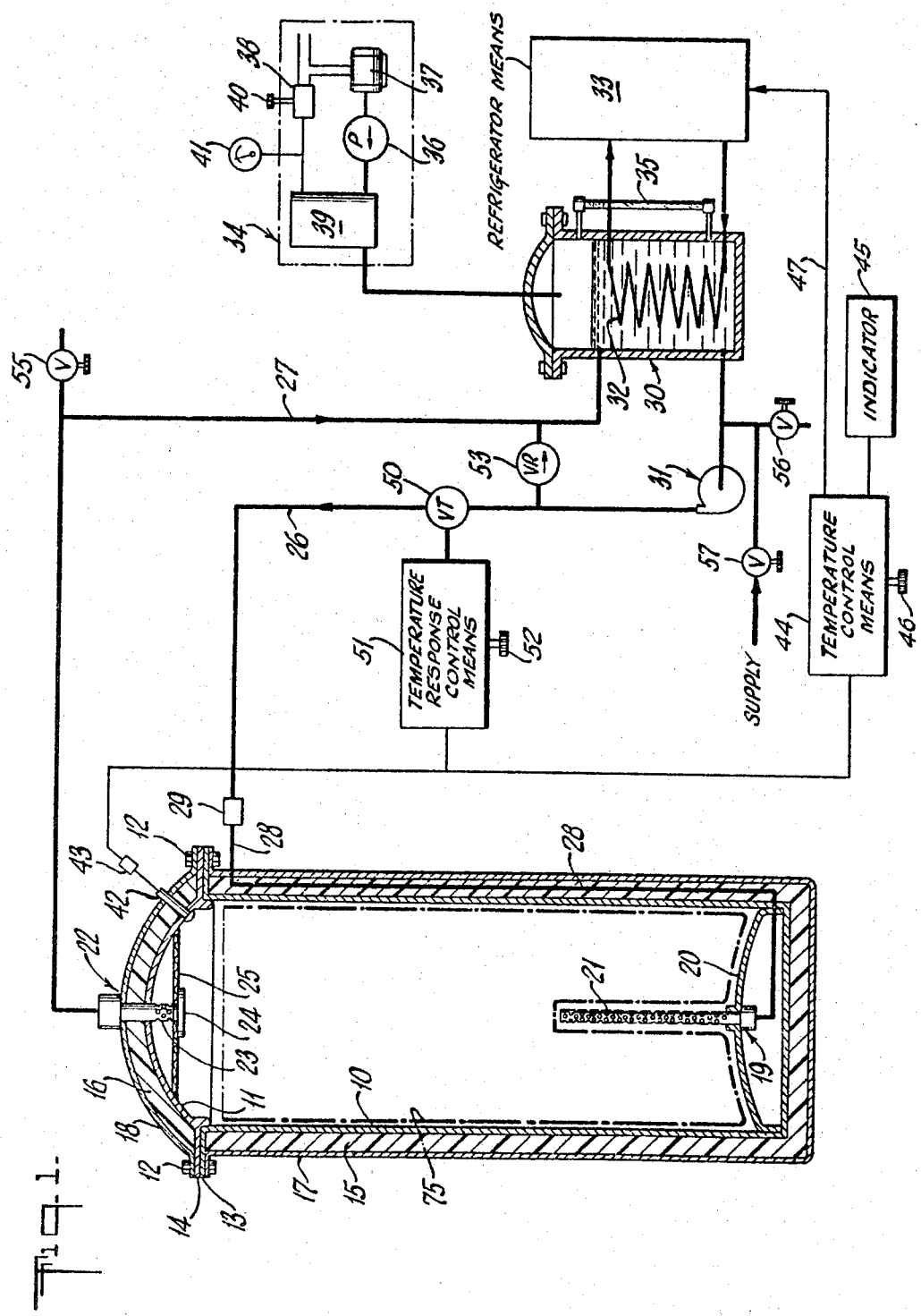
FIG. 1 is a simplified diagram schematically indicating interconnected components of a storage system of the invention.

Referring to FIG. 1, the invention is shown in application to a relatively non-dilatable pressure vessel, such as a boiler shell 10, with a removable top or end closure 11. Closure 11 is releasably secured to shell 10 by clamp means 12 at overlapped flanges 13-14 forming adjacent circumferential limits of the shell and closure 10-11. Shell 10 and its closure 11 are spaced by thermal insulation 15-16 within suitable outer shell or jacket means 17-18.

For coolant circulation, an inlet fitting 19 is mounted in the fixed bottom wall 20 and preferably includes a central upstanding perforated-tube section 21, projecting within the vessel 10. An outlet fitting 22 may be similarly carried by the closure 11 and is shown to include a slotted or perforated-tube section 23, projecting internally and toward the vessel 10. A flange or plate 24 at the end of tube 23 retains a screen 25 within the concavity of closure 11, to assure against blockage of outlet flow.

As indicated generally above, the temperature, pressure and flow of coolant to the storage vessel are controlled externally. The coolant supply utilizes inlet and outlet pipes 26-27, which may have detachable, self-sealing connection at 19-22 to the vessel; in the form shown, convenience is served by providing a separate line portion 28, from the bottom fitting 19, and extending upward along the outer surface of shell 10 to a detachable self-sealing connector 29 for the inlet pipe 26. A pressurized cooling vessel or heat exchanger 30 and circulating pump 31, preferably glandless, complete the coolant circuit, except for various valves as needed to fill and drain the system. The pump 31 is shown in the inlet line 26, drawing coolant from the lower region of the exchanger 30, while return flow in line 27 is made to the upper region of exchanger 30.

The cooling vessel 30 includes a heat-exchanging coil 32 coursed by a refrigerant such as freon supplied and circulated from a cold source or refrigerator 33. Vessel 30 is pressurized by means such as an air compressor 34 delivering pressurized air to the top of vessel 30, as over a flexible diaphragm to seal a limited air volume from the larger liquid volume within vessel 30; as shown, however, the air under pressure is applied directly over the coolant surface, and level-indicating means such as a float-operated device (not shown) or sight glass 35 enable personnel to monitor an adequate coolant level which covers the coil 32.

The pressurizing means 34 may be an air compressor 36 driven by an electric motor 37, and switch or relay means 38 responsive to delivered pressure, as from an accumulator 39, may regulate motor operation to assure maintenance of the elevated pressure selected by switch adjustment at 40; an indicator of the controlled pressure is shown at 41.

The temperature control of coolant may utilize a suitable probe such as a thermistor or thermocouple carried by the wall of vessel 30 and constantly exposed to coolant therein; however, in the form shown, such a probe 42 is carried by the removable closure 11 of vessel 10. A detachable connector 43 is shown for connecting electrical response of probe 42 to suitable temperature-control means 44 including an indicator 45 for continuous display of the monitored coolant temperature in vessel 10. Control means 44 may include an electrical bridge with suitable internal-reference provision and incorporating the probe output into an arm of the bridge; manual means 46 is shown for selective adjustment of a bridge-imbalance condition to generate a control output in line 47 to the refrigerator means 33.

For shorter lag in the temperature control of coolant in vessel 10, a throttle valve 50 is shown in the supply line 26. Valve 50 is controlled by means 51 responding to the instantaneous output of probe 42, as determined by a temperature level selected by adjustment at 52. A relief-valve mechanism 53 automatically shunts pumped coolant directly to the return line 27, thus avoiding excessive pump-output pressure whenever the throttle valve reduces flow to vessel 10. Preferably, the control means 51 is present to provide a fast-acting safety cut-off of coolant supply to vessel 10, to assure that a preselected minimum temperature below zero, e.g., −2°C (for a coolant-pressure condition of 250 psi), will not be exceeded, thus assuring against icing conditions within the comestibles. The setting of control means 44 to operate the refrigerator 33 should, on the other hand, be for a lower temperature, to assure adequate cold-producing potential for operation of the system.

In use, the vessel 10 is first filled with a load of live fish to be stored. The closure 11 is then secured and sealed. Supply and control connections are made at 22–29–43. An air-escape valve 55 in the most elevated part of the system is opened, and a drain valve 56 in the lowest part of the system is closed. Liquid coolant such as an isotonic solution of reconstituted sea water is then introduced to fill the system, by operation of a supply valve 57. The coolant thus fills all pipes and all voids between the fish and within vessel 10. When filled, coolant will escape at 55, whereupon valves 55 and 57 are closed. The air compressor 34, pump 31, and refrigerator 33 are then started and are run in a program of temperature-reduction and pressure-elevation best suited to the processing (i.e., within the cell environment-adaptability tolerance) of the particular comestibles being stored. I have found that a practical terminal or storage condition exists for fish and other comestibles when the coolant is pressurized at substantially 250 psi and when the coolant (e.g. sea water) is −2°C. Of course, the described automatic controls will maintain such conditions as long as needed, and as a practical matter the mean regulated temperature is preferably −1.6° or −1.7°C, to assure against damaging transient excursions of cold below −2°C, for the indicated particular pressure of substantially 250 psi.

In the construction of a vessel 10 to contain 1000 liters, i.e., a metric ton, of fish and sea water, the total insulated surface area is in the order of 70 square feet, for a vessel (10) length of 2 meters and diameter of 80 cm. The perforated inlet tube 21 projects upwardly for about one-third of the vessel length. Insulation 15–16 is a 3-inch thick jacket of foamed urethane having a heat-flow rate of 0.125 BTU/hr./sq.ft. per inch of thickness. Under such conditions, a refrigerator capacity (at 33) of 325 BTU/hour is more than adequate to control temperature within the stated limit, even for outside ambient temperatures at 90°F.

The actual program of compression (while cooling) and, then later on, decompression (while restoring to ambient temperature) is not particularly critical. For example, one program well suited to the handling of fish will also do perfectly well for the handling of tomatoes. The main point to be observed in such programming is that adequate time be provided for the organism to adapt successfully to its new environment and that in approach to otherwise freezing conditions the maximum environmental pressure shall have preceded the minimum environmental temperature; in decompression, the order is reversed, in that pressure is held high until temperature has withdrawn from the region of icing potential. Generally speaking, a 15-minute period for compression (with cooling), and a similar period for decompression (while restoring to ambient temperature) is adequate for the safe handling of the comestibles I have thus far stored, in use of the invention.

The precise mechanism of what has happened to the comestible organisms in the course of my processing is not completely understood. However, it is believed that my technique has enabled the metabolic rate of any fresh comestible to be safely reduced, and very substantially reduced, as compared to the rate under ambient conditions; by "safely," I mean without deleterious formation of ice or solutes within the cells of the organism. Thus, a fresh fish, which will relatively quickly deteriorate at ambient or normal refrigerating temperatures, is found to be in "ocean-fresh" condition even after three months of storage in my equipment. And a ripe tomato, which can quickly become overripe at ambient or normal refrigerating levels, is found to be in "vine-ripe" condition after 4 months of storage in my equipment. Similar "fresh-life" extensions are available for other comestibles, the actual period of extension being a function of the normal deterioration property of the particular organism.

Figure 2:
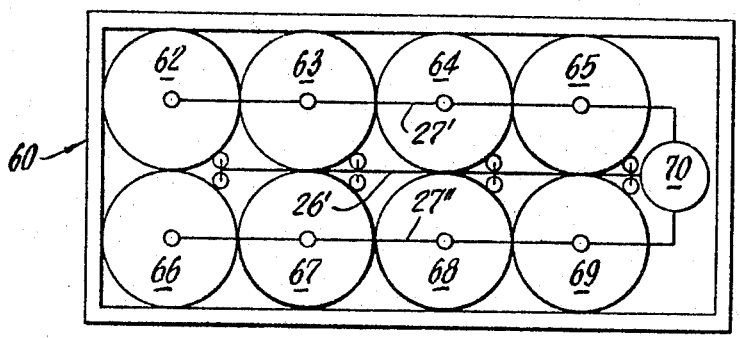
FIG. 2 is a simplified plan view of a modification having a capacity substantially greater than that of FIG. 1.
Figure 3:
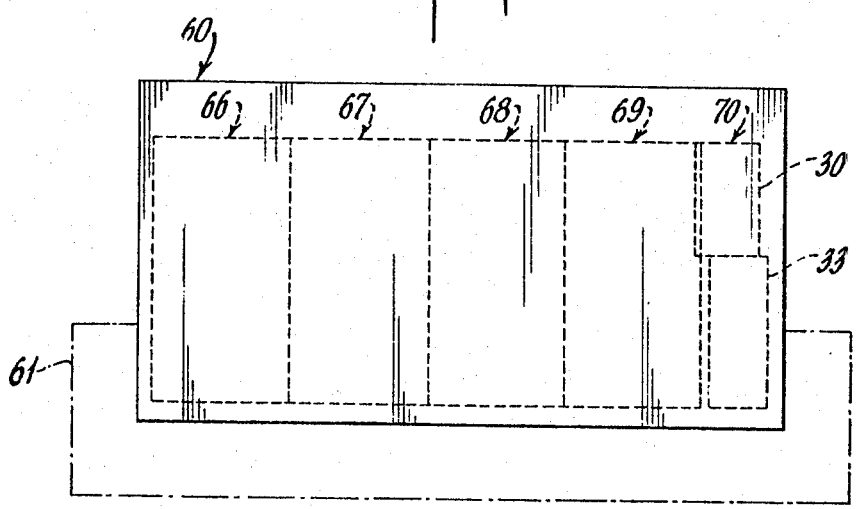
FIG. 3 is a simplified view in elevation of FIG. 2.

It is important to note that since my method relies on coolant supply from a location outside the storage vessel, it is practical to have a single pressurizing, cooling, and pumping unit serve a plurality of storage vessels 10. It is also practical to combine several storage vessels and a single coolant supply unit, all in a single module, appropriate to particular shipping and/or warehousing requirements. FIGS. 2 and 3 are simplified diagrams to illustrate such a combination in a single shipping module 60, of rectangular-prismatic overall configuration, and carrying or adapted to seat upon suitable shock-mounting structure (suggested by phantom outline 61). In the form shown, eight similar vessels 62–63–64–65 and 66–67–68–69 are arrayed as paired groups of four. All these vessels are served by pressurized coolant from the same means 70, which will be understood to embody pressurizing, cooling and pumping capabilities discussed in connection with means 30–31–33–34 in FIG. 1. A coolant-supply line 26' feeds coolant in branched parallel paths to the bottoms of all vessels, and two return lines 27'–27'' serve the outlets of the respective vessels of both groups. The legends in FIG. 3 indicate a preference for conserving space by placing the refrigerator 33 below the heat-exchange vessel 30. The frame of module 60 may be a bridge-like system of braced girders; preferably, the walls of module 60 are closed.

It will be seen that I have described an improved method and means which meets the stated objects. The invention brings to consumers products of hitherto unavailable quality, and for greatly extended seasonal periods. Numerous modifications and convenience features will occur to those skilled in the art. For example, the comestibles may first be loaded in a basket-like structure (suggested by heavy phantom outline 75 in FIG. 1), shaped to clear the wall of vessel 10 and its supply tube 21, so that such structure may be quickly, partially or wholly, removed from a given vessel, to permit transient access to a fraction of the contents; whereupon, the remaining cosmetibles in the basket structure may be returned to vessel 10 for recycled storage procedures.

Also, it will be appreciated that the stated means for cooling the suspension liquid and for pressurizing the same may be quite different from the specific form shown. For example, the cold source, for coolant cooling, may be an encapsulated supply of liquid nitrogen (or other gas), carried by the container 10 assembly and vented to atmosphere under thermostatic control, as through a coil or a jacket (or manifold) around the vessel 10. The sudden venting of liquified-gas flows involved in such control may be used, as via a turbine or other mechanical element responding to gas flow, to stir or otherwise accomplish the circulation of the suspension liquid or sea-water within the closed vessel, for relatively rapid and homogeneous readjustment to the resulting newly controlled temperature condition. And pressure elevation to the desired degree may be accomplished by controlled piston-displacement action (e.g., with controlled adjustment of threaded positioning) of the closure of an otherwise non-dilatable vessel 10.

I claim:

1. An apparatus for storing comestibles at reduced temperature and elevated pressure whereby the metabolic rate of said comestibles is lowered comprising a nondilatable comestible storage vessel, a heat exchange vessel, circulating means for causing a cooling liquid to circulate through said storage vessel and said heat exchange vessel without changing state, throttling valve means included in said circulating means connected to said storage vessel, thermostatic control means including a temperature sensitive probe for controlling said throttling valve, refrigeration means for causing a refrigerant to circulate through the heat exchange vessel, and pressurization means for supplying a pressurized gas to the heat exchange vessel whereby pressure is applied to the cooling liquid and transmitted to the storage vessel.

2. The combination of claim 1, in which said probe is carried by part of said storage vessel.

3. The combination of claim 1, in which said circulating means includes a glandless pump.

4. The combination of claim 1, in which said storage vessel is cylindrical, with a fixedly closed end and with a removable closure for the other end, said ports being at said ends.

5. The combination of claim 1, in which said storage vessel is cylindrical, with a fixedly closed end and with a removable closure for the other end; and strainer-basket means removably insertable in said vessel via the opened end.

6. The combination of claim 1, further comprising a flexible diaphram within the heat exchange vessel which separates the cooling liquid from the pressurized gas.

7. The combination of claim 1, further comprising water used as the cooling liquid.

8. The combination of claim 1, further comprising sea water used as the cooling liquid.

9. The combination of claim 1, further comprising strainer means substantially enshrouding an end of said storage vessel.

10. The combination of claim 1, wherein said circulation means comprises lines connecting said storage vessel and heat exchange vessel and a shunt connecting said lines on the heat exchange side of said throttling valve.

* * * * *